Jan. 13, 1970   R. C. ERWIN   3,489,055
SCREW AND NUT ASSEMBLY
Filed June 17, 1968   2 Sheets-Sheet 2
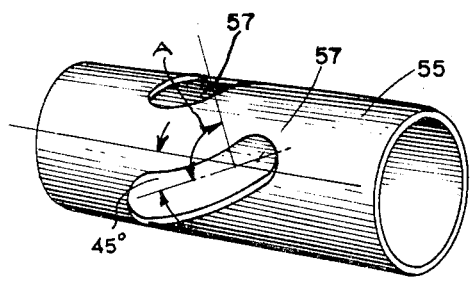
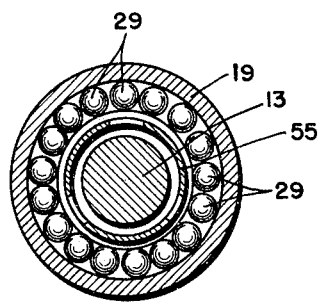
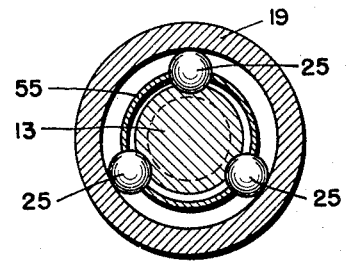
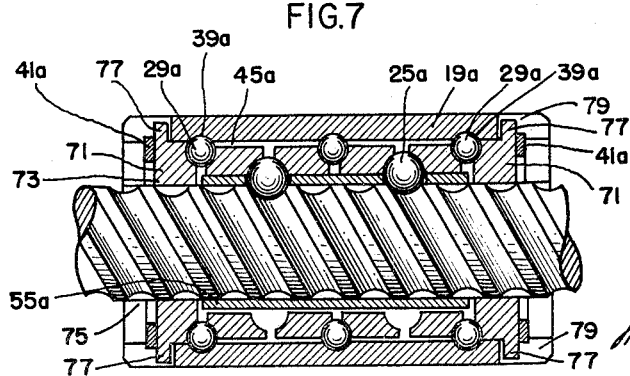
INVENTOR
RALPH C. ERWIN
ATTYS.

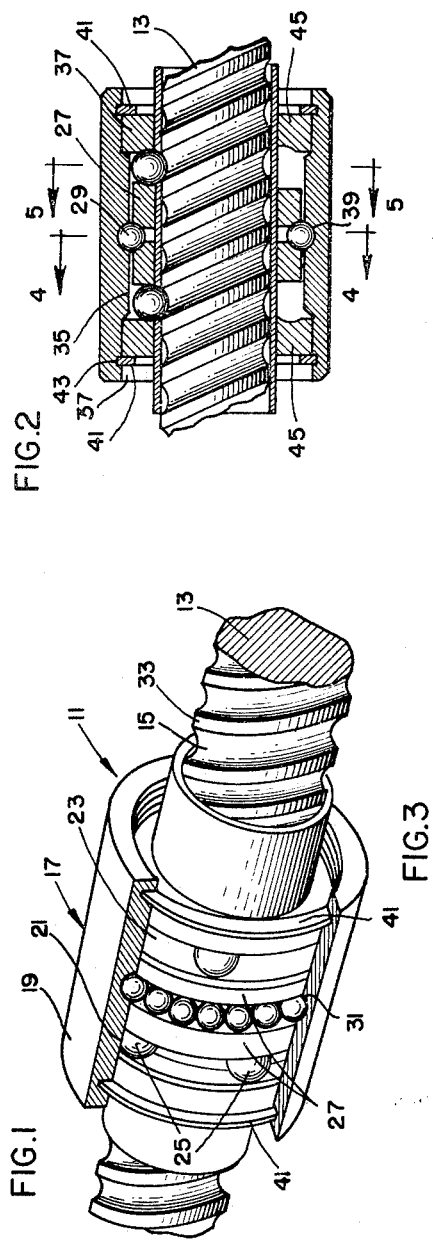
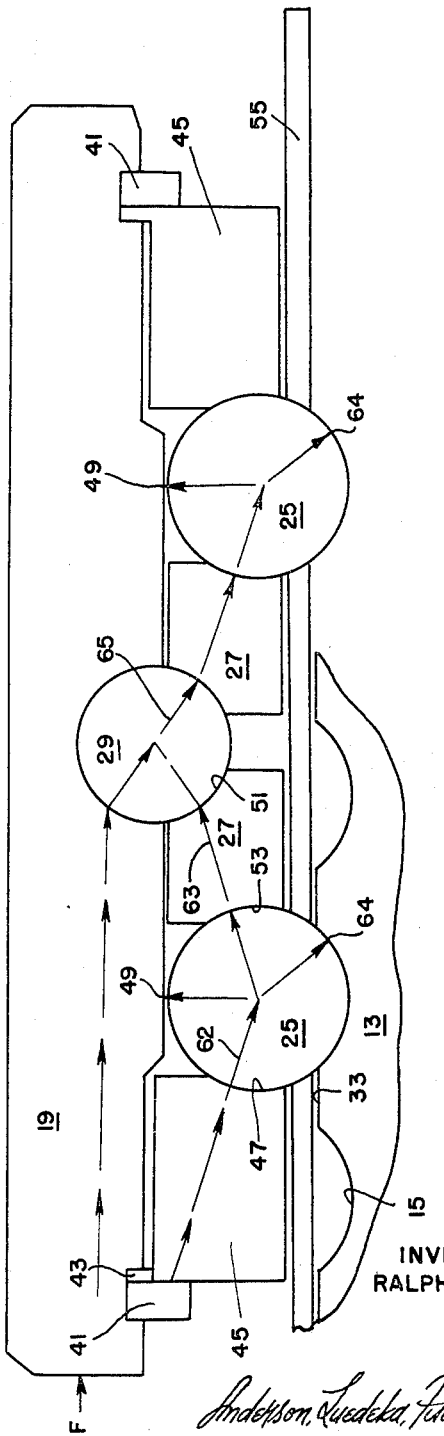

3,489,055
SCREW AND NUT ASSEMBLY
Ralph C. Erwin, 7227 N. Ridge Ave., Apt. 2C,
Chicago, Ill. 60645
Filed June 17, 1968, Ser. No. 737,683
Int. Cl. F16b 37/00, 15/00, 7/00
U.S. Cl. 85—32          8 Claims

ABSTRACT OF THE DISCLOSURE

In a screw and nut assembly for converting rotary motion to linear motion or vice versa, rotatable thrust rings are provided between sets of rolling elements and are shiftable longitudinally of the screw with axially directed loads to transmit a portion of the load from one set of rolling elements to another set.

---

This invention relates to threaded screw and nut assemblies or drives for converting linear motion into rotary motion or vice versa and, more particularly, to an assembly of the kind in which the nut has a plurality of sets of rolling elements such as, for example, sets of balls for rolling engagement with the screw thread.

When a screw and nut assembly is being operated, thrust forces are generated and tend to concentrate on one set of the balls resulting in high friction forces on one set of balls. These high friction forces result in a relatively low mechanical or operational efficiency for the screw and nut assembly. Additionally, excessive concentration of a load on one set of balls reduces the operational life of the assembly by causing metal fatigue of the balls or the screw thread. Metal fatigue results in flaking or pitting of the rolling contact surfaces which might otherwise be avoided if such thrust load were distributed more uniformly and across larger contact areas.

Accordingly, a general object of the present invention is to provide mechanical screw and nut assembly of the foregoing kind having reduced friction and improved load distribution characteristics.

Other objects and advantages of the invention will become apparent from the detailed description taken in connection with the accompanying drawings in which:

FIGURE 1 is a fragmentary, perspective view of a mechanical screw and nut assembly with the nut partially broken away to show the interior thereof and constructed in accordance with the preferred embodiment of the invention;

FIGURE 2 is a longitudinal sectional view of reduced size of the nut and screw assembly of FIGURE 1;

FIGURE 3 is an enlarged, diagrammatic view illustrating a distribution of a thrust load for the screw and nut assembly of FIGURE 1;

FIGURE 4 is a sectional view taken substantially along the line 4—4 of FIGURE 2;

FIGURE 5 is a sectional view taken along the line 5—5 of FIGURE 2;

FIGURE 6 is a perspective view of an anticirculating tube used in the nut of FIGURE 1; and FIGURE 7 is a perspective view of another embodiment of the invention.

As shown in the drawings for purposes of illustration, the invention is embodied in a mechanical screw and nut assembly 11 (FIGURE 1) which includes an elongated screw 13 having a helical thread 15 on which is threaded a nut 17. Very generally, the nut 17 includes an outer housing in the shape of a sleeve 19 enclosing first and second sets 21 and 23 of thrust balls 25 which are disposed in the helical screw thread 15. To reduce friction and provide a more uniform distribution of thrust loads between the respective sets 21 and 23 of thrust balls there is provided a unique means in the form of a pair of thrust rings 27 which float between the first and second sets of thrust balls and a set of retaining balls 29 seated in a groove 31 in the sleeve 19. As will be explained, the thrust rings 27 are free to rotate relative to the screw 13 and are free to shift longitudinally relative to the sleeve 19 to transfer a longitudinally directed thrust from one set of thrust balls to the other set of thrust balls.

Referring now in detail to the individual elements of the nut and screw assembly 11, the illustrated screw 13 is an elongated metal shaft having a longitudinal axis with its helical screw thread 15 formed by an arcuate cross sectioned groove in the outer surface 33 of the screw. The illustrated screw has a uniform pitch and a uniform lead throughout its length and is a three start thread. The arcuate wall of the screw thread is complementary to the curve of the thrust balls 25 and is of a depth to receive only the lower portions of these balls. It is to be understood that shapes and forms of the screws may be varied and it may have other kinds of threads, for example, double threads etc., and fall within the purview of the invention.

The housing for the nut 17 may also be of various shapes depending upon the input or output device (not shown) with which it is associated. In this instance, the nut housing is the generally cylindrical shaped sleeve 19 which has a longitudinally extending bore defined by a central, annular wall 35 (FIGURE 2) of smaller diameter than adjacent annular walls 37 at the outer end of the sleeve bore. An annular groove 39 of arcuate cross section is formed in and is disposed generally centrally of the central bore wall 35 to receive the set of retaining balls 29. The retaining ball groove 39 is a plane perpendicular to the longitudinal axis of the sleeve 19. The arcuate cross section of this groove 39 is complementary to the curve of the retaining balls 29 which are seated therein and which are free to rotate about and within the groove 39.

For the purpose of retaining thrust balls 25 within and in proper position in the nut 17, retaining means are provided at the ends of the sleeve 19. In this instance, the retaining means includes a pair of annular snap rings or washers 41 which snap fit into annular notches 43 in the sleeve walls 37 adjacent the ends of the sleeve 19. While each of the retaining washers 41 may directly engage and hold a respective set of thrust balls 25 against a longitudinal escaping movement from the nut, it is preferred that the retaining means also include an outer thrust ring 45 which is in the shape of a generally rectangular cross sectioned ring. Each outer thrust ring 45 engages the retainer washer 41 at its upper and outer corner and engages thrust balls 25 at its inner and lower corner in which is formed an annular groove 47 having an arcuate cross section to receive and seat a portion of the thrust balls.

The thrust balls 25 are preferably larger in diameter than the regulating balls 29; and, when seated to the maximum extent possible in the thread 15, the outer peripheries of the thrust balls extend closely adjacent to the inner sleeve wall 35. Preferably, the clearance between this sleeve wall 35 and the periphery of a fully seated thrust ball 25 is quite small so that, as will be explained in greater detail, a thrust load will cause the thrust balls 25 to roll up on one side of the screw thread 15 and into engagement with the sleeve inner wall 35 at points 49 (FIGURE 3).

The number of thrust balls 25 in each set 21 and 23 may be varied from the three balls 25 illustrated in FIGURE 5. It is preferred that the balls 25 in each set be spaced at equal angles of 120° about the screw 13. This is in contrast to the large number of smaller retaining balls 29 illustrated in FIGURE 6 as providing a continuous series of balls about the screw 13.

To transfer the thrust between the respective sets 21 and 23 of thrust balls 25, it is preferred that the thrust rings 27 be annular and free floating relative to the encircling sleeve 19 and encircled screw 13. In the illustrated embodiment of the invention, the thrust rings 27 are supported between a set of thrust balls 25 and the set of regulating balls 29. Preferably, the thrust rings are spaced by a clearance of at least 0.005 of an inch from the inner small diameter wall 35 of the sleeve 19 and are spaced by an even larger clearance with the inner ball holding tube 55. As the thrust rings 27 are supported only by the rotatable regulating balls 29 and thrust balls 25, the rings 27 are free for rotation relative to the outer sleeve 19 and the screw 13.

Each of the thrust rings 27 is generally rectangular in cross section and has an upwardly opening, annular groove 51 in its upper, inner corner to engage and seat a portion of the lower and outer quadrant of the regulating balls 25. At the lower, opposite corner of each thrust ring is formed an arcuate cross sectioned groove 53 which engages and seats a portion of the upper and inner quadrant of a set of thrust balls 25. Due to clearances, the thrust rings 27 may shift slightly in the direction parallel to the longitudinal axis of the screw 13 as one set of thrust balls 25 begins to transfer a portion of its load to the other set of thrust balls 25. The inner thrust rings 27 are, thus, in a sense floating between the respective sets of balls 25 and 29 and the sleeve 19 and screw 13 and are free to turn and shift laterally of the screw to distribute thrust loads to and among the thrust balls 25.

To hold the respective thrust balls 25 at the proper angular spacing about the screw 13, there is provided an anti-circulating means in the form of the tube 55 (as best seen in FIGURE 6) which is relatively thin walled and has three openings in the form of angularly directed slots 57 each for receiving a thrust ball 25. It is preferred that the slots 57 have an angle A of 90° or greater from the 45° lead angle for the illustrated screw 13. The anti-circulating tube 55 is telescoped on the screw 13 and the bore of tube is sufficiently larger than the screw 13 so that it is free for turning about the screw. The thrust balls 25 tend to follow the direction of rotation of the screw 13, but the balls react against the tube 55 which is then forced by the balls to turn in a direction opposite to the direction of screw turning.

The preferred relationship of the thrust rings 27, thrust balls 25 and retaining means can best be understood and analyzed from the enlarged diagrammatic illustration of FIGURE 3. For example, if a thrust force F is applied to the left end of the sleeve 19, the retaining ring 41 applies a longitudinally directed force to the upper left end corner of the outer thrust ring 45 which then exerts a force having an inwardly and rightwardly directed force component on the set 21 of the thrust balls 25, as indicated by the dashed line 62 in this figure. This force component urges the thrust balls of set 21 to roll up (as viewed in FIGURE 3) the right side of the thread 15 and move outwardly into load supporting engagement with the wall 35 of the sleeve 19 at the point 49. Also, this set 21 of thrust balls will engage the left thrust ring 27 and urge it to the right and against the retaining balls 29 as indicated by the dashed arrow 63 extending thereto. While this force, indicated by the arrow 63, has an upward component as well as a rightward component, its rightward component is being transferred by the retaining balls 29 to the right hand thrust ring 27 to urge it to the right.

In addition to the force from the right thrust ring 27 on the retaining balls 29, the longitudinally directed thrust force F on the sleeve 19 is also exerting a force having a generally downward and rightward force component, as indicated by the arrow 65 (FIGURE 3), on the retaining balls 29 which, in turn, urge the right thrust ring 27 inwardly toward the axis of the screw 13 and to the right and against the right thrust ball set 23. These forces cause the right set 23 of thrust balls 25 to shift rightwardly against the thread 15 at the point 64 and to rise and move outwardly to engage the sleeve wall 35 at the point 49. The ball set 23 also exerts a rightwardly directed force on the outer thrust ring 45 and retaining ring 41. In this manner, the thrust force F is distributed between the left thrust ball set 21 and the right thrust ball set 23. During relative rotation between the screw 13 and nut 17, the thrust balls 25 are able to distribute their load at three points or areas of contact, namely, with the sleeve 19 at the point 49, with the screw 15 thread at point 64 (FIGURE 3) and with a thrust ring 27 at its groove 53. As the thrust rings 27 are free to rotate relative to the balls 25 and 29, the sleeve 19 and screw 13, the support of the load and transfer of the thrust forces is accomplished with a minimum of binding or friction.

Another embodiment of the invention is illustrated in FIGURE 7, and elements which are similar or identical to those previously described elements are indicated by the same reference characters as used to describe these elements in the embodiment of FIGURES 1–6 but with a suffix *a* added. In this embodiment of the invention, the sleeve 19*a* is provided an additional outer pair or retaining ball grooves 39*a* in which are seated additional sets of retaining balls 29*a*. Each of these outer sets of retaining balls 29*a* is disposed between outer thrust rings 45*a* and and end ring 71 which is held against sliding from the sleeve 19*a* by a retainer washer 41*a* seated in a groove in the sleeve 19*a* and abutting the end ring.

In this embodiment of the invention, means are provided to interlock the sleeve 19*a* to the ball holding tube 55*a* so they function as a unit and do not rotate relative to one another. Herein, the interlocking means includes an inwardly projecting key 73 on each end ring 71 projecting into a notch 75 on the ball holding tube 55*a*. An outwardly projecting key 77 on each end ring 71 projects into a notch 79 formed in the wall of the sleeve 19*a* at its ends. In this manner, keys 73 and 77 on the end rings interlock the sleeve 19*a* and the tube 55*a* together as a unit and hold them against rotation relative to one another.

While the sleeve 19 (FIGURE 1) is supported by the thrust ball sets 21 and 23 and the retaining balls 25, the sleeve 19*a* (FIGURE 7) is supported directly by the three sets of regulating balls 25 and only indirectly by the thrust balls 25*a*.

Additional sets of thrust balls may be added to the sets 21 and 23 in the illustrated embodiment of the invention. In some instances in which the screw is quite long, the preferred unit of a left thrust ball set 21, left thrust ring 27, retaining balls 29, right thrust ring 27 and right set 23 of thrust balls is duplicated several times along the length of the screw to support a long sleeve 19. In other instances, the retaining balls 29 have been eliminated; and in lieu thereof, an additional set of thrust balls is disposed intermediate the left and right thrust rings to keep them separated and free to rotate relative to the sleeve and screw. While the balls 25 have been termed thrust balls to indicate this function, it will be appreciated that the balls 25 as well as the balls 29 also carry radially directed loads. Moreover, it is within the purview of the invention that other forms of rolling elements, such as tapered or cylindrical rollers commonly used in bearings be used in lieu of the balls 25 or 29.

From the foregoing, it will be seen that the nut and screw assembly functions to transfer and divide the thrust loads among the bearings and operates with reduced frictional losses.

While a preferred embodiment has been shown and described, it will be understood that there is no intent to limit the invention by such disclosure but, rather, it is intended to cover all modifications and alternate constructions falling within the spirit and scope of the invention.

What is claimed is:

1. A screw and nut assembly comprising, an elongated screw having a longitudinal axis and helical groove defining a thread in the outer surface thereof, a housing having a bore-defining wall encircling and spaced from said screw, a first and second set of thrust balls disposed within said housing and seated in turns of said helical groove, a ball receiving groove formed in said housing wall, a set of retaining balls seated in said groove in said house wall, retaining means associated with said housing for confining said thrust balls within said housing, and a pair of thrust rings, each thrust ring being mounted intermediate a set of said thrust balls and said set of retaining balls, said thrust rings being free to rotate about said screw and to shift longitudinally thereof for transferring a portion of the load from one set of thrust balls to the other set of thrust balls.

2. The assembly of claim 1 in which said first and second set of thrust balls are disposed to move into load supporting engagement with said bore-defining housing wall upon application of a thrust load to said assembly and thereby establish a three point contact with said screw, said housing and a thrust ring.

3. The ball screw and nut assembly of claim 1 in which said thrust rings have an annular groove on one side thereof to seat a set of thrust balls and another annular groove on the other side to seat said retaining balls.

4. A screw and nut assembly in accordance with claim 1 in which means are provided to hold said thrust balls spaced from each other and at spacings equidistant from one another about said screw.

5. A screw and nut assembly in accordance with claim 4 in which said ball holding means includes a tube telescoped on said shaft and having ball receiving openings therein through which said thrust balls project into engagement with said screw thread and in which the walls defining said openings in said tube hold said thrust balls against moving to engage an adjacent thrust ball.

6. A screw and nut assembly in accordance with claim 5 in which means interlock said housing and said ball holding tube against rotation relative to one another.

7. A screw and nut assembly comprising an elongated screw having a longitudinal axis and a helical groove defining a thread in the outer surface thereof, a housing having a bore defining wall encircling and spaced from said screw, a plurality of sets of rolling elements disposed within said housing and seated in spaced turns of said screw thread and supporting said housing, and thrust load distributing means disposed in said housing intermediate adajcent sets of rolling elements for contact with said adjacent sets of rolling elements, said thrust load distributing means being shiftable longitudinally of said screw by one set of rolling elements to transfer a portion of a thrust load to and among the sets of rolling elements.

8. A screw and nut assembly comprising an elongated screw having a longitudinal axis and helical groove defining a thread in the outer surface thereof, a housing having a bore-defining wall encircling and spaced from the screw, a first set of thrust balls disposed within said housing and seated into a turn of said helical groove for engaging said groove at first contact points which are along radially inner quadrant portions of said balls, retaining means on said housing for engaging said thrust balls at second contact points which are along radially outer quadrant portions of said thrust balls but spaced radially inward of the outermost tangential points on said thrust balls, a second set of thrust balls disposed in said housing and seated in a turn of said helical groove, first and second rotatable thrust means disposed in said housing intermediate said first set and said second set of thrust balls and engaging said thrust balls at third contact points which are spaced radially outward of said first contact points whereby a longitudinally directed thrust load results in said thrust balls having three point contact with said screw, said retaining means and said thrust means, a set of retaining balls disposed intermediate said first and second thrust means and rotatable about said screw, and a retaining tube encircling said screw and having openings through which project said thrust balls to engage said screw, said retaining tube holding said thrust balls against rotational movement while allowing said thrust balls to turn in place.

References Cited

UNITED STATES PATENTS

| | | |
|---|---|---|
| 1,862,704 | 6/1932 | Prouty et al. |
| 2,718,165 | 9/1955 | Bourassa et al. |

FOREIGN PATENTS

| | | |
|---|---|---|
| 619,898 | 5/1961 | Canada. |
| 943,329 | 10/1948 | France. |
| 1,020,955 | 2/1966 | Great Britain. |

RAMON S. BRITTS, Primary Examiner

U.S. Cl. X.R.

85—46; 285—390; 287—117